United States Patent
de Melo Neto

(10) Patent No.: US 6,626,548 B2
(45) Date of Patent: Sep. 30, 2003

(54) REAR-VIEW MIRROR ASSEMBLY FOR A MOTOR VEHICLE WITH A MIRROR STABILIZATION DEVICE

(75) Inventor: Leônidas Venâncio de Melo Neto, Guarulhos-Estado de São Paulo (BR)

(73) Assignee: Metagal Industria e Comercio Ltda., Sao Paulo (BR)

( * ) Notice: Subject to any disclaimer, the term of this patent is extended or adjusted under 35 U.S.C. 154(b) by 131 days.

(21) Appl. No.: 10/010,331

(22) Filed: Nov. 8, 2001

(65) Prior Publication Data

US 2003/0086187 A1 May 8, 2003

(51) Int. Cl.[7] .............................. G02B 5/08; G02B 7/18
(52) U.S. Cl. ........................ 359/841; 248/476; 248/636
(58) Field of Search ................................ 359/841, 872, 359/877; 248/476, 479, 636

(56) References Cited

U.S. PATENT DOCUMENTS

| | | | | |
|---|---|---|---|---|
| 4,277,140 A | * | 7/1981 | Manzoni | 248/478 |
| 5,557,476 A | * | 9/1996 | Oishi | 359/841 |
| 5,818,650 A | * | 10/1998 | Nyhof et al. | 359/876 |
| 5,844,733 A | * | 12/1998 | Ravanini | 359/872 |

* cited by examiner

Primary Examiner—Mark A. Robinson
(74) Attorney, Agent, or Firm—Michael J. Striker

(57) ABSTRACT

A stabilization device for a rear-view mirror of a motor vehicle includes a mirror set (1) having a sleeve (41) incorporated in a support structure (20) of the mirror set (1) and articulated in a pivot post (60) of a base member (70). The device proportions and determines the stabilization of the mirror set through an axially squeezing "F" force to the pivot post (60) of the mirror set (1). The sleeve has a first indented surface (42) and a second indented surface (43) in the base (70) that is adjacent to the first indented surface (42). The first and second indented surfaces (42, 43) have corresponding profiles to engage one in the other. An axial compression spring (44) disposed about the pivot post (60) presses the sleeve (41) to couple the surface (42) of the mirror set (1) in the indented surface (43) of the base (70). A reaction washer (45), fixed around the pivot post (60), presses against the spring (44). The pivot post (60) has an intermediary radial hole (62). The second indented surface (43) is incorporated in face of a ring (43') having a radial hole (91), through which the pivot post (60) is received. A pin (92) is received through the aligned radial holes (62, 91), fixing the ring (43') about the pivot post (60).

3 Claims, 3 Drawing Sheets

REAR-VIEW MIRROR ASSEMBLY FOR A MOTOR VEHICLE WITH A MIRROR STABILIZATION DEVICE

BACKGROUND OF THE INVENTION

The present invention relates generally to rear-view mirrors for vehicles, and more particularly, relates to a rear-view mirror assembly having stabilization device for stabilizing the position of the mirror plate.

In Applicant's related patent application, Ser. No. 09/782,866, now U.S. Pat. No. 6,361,179 which is incorporated herein by reference, a stabilization device for an external rear-view mirror for automotive vehicles is disclosed and claimed, which essentially comprises a mirror set and a base connected to the mirror set in an articulated manner. The mirror set generally is made up of a mirror plate having a selected position, a regulation device for controlling the mirror plate position, a support structure, into which the regulating device activator is fixed, and a housing that accommodates the components of the mirror set also fixed in the support structure. The mirror set also includes a stabilization device for stabilizing the position of the mirror incorporated in the support structure and mounted in an articulated manner around a vertical pivotal post of the base. The stabilization device essentially comprises the pivot post and a plate structure that is fixed laterally in the vehicle and which has an extension or flange portion, into which is incorporated an end of the post. The stabilization device for the mirror determines the stabilization of the mirror set through the axial squeezing force, "F", to the pivot post and includes a sleeve, incorporated in the support structure articulated in the pivot post, a first indented surface on the mirror set disposed in the sleeve, and a second indented surface of the base adjacent to the first indented surface of the sleeve. The first and second indented surfaces have corresponding profiles such that they are engageable one in the other. The device also includes an axial compression spring disposed around the pivot post and which compresses the sleeve to couple the indented surface of the mirror set disposed in the sleeve in the indented surface of the base. The device also includes a reaction washer fixed about the pivot post and against which the spring is compressed.

The present invention offers an improvement to the above-described mirror stabilization device, specifically regarding the pivot post and the second indented surface of the device, and provides a more efficient functioning of the device.

DETAILED DESCRIPTION OF THE PREFERRED EMBODIMENTS

Figure 1:
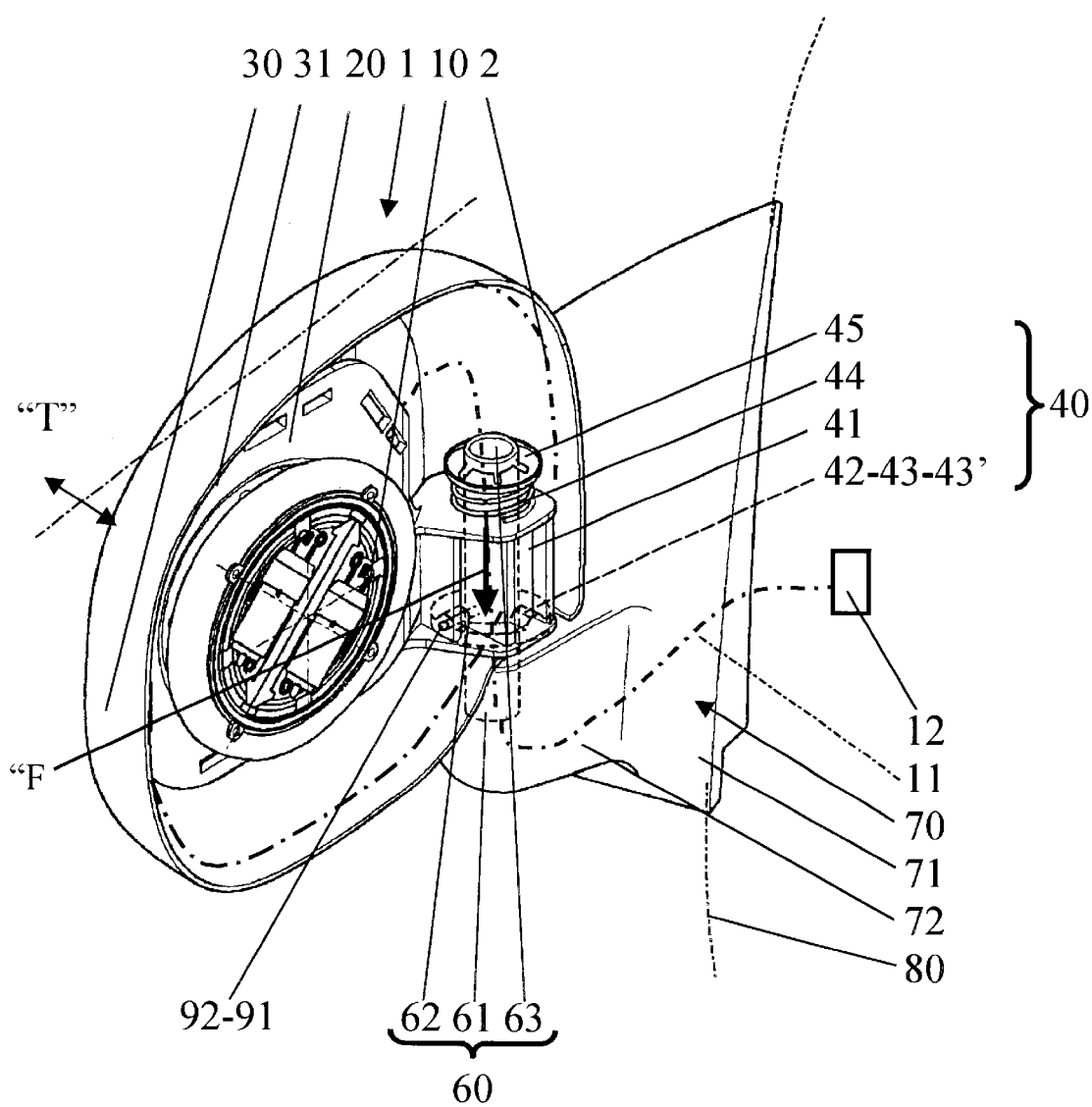
FIG. 1 shows a perspective view of a mirror with the stabilization device of the present invention.
Figure 2:
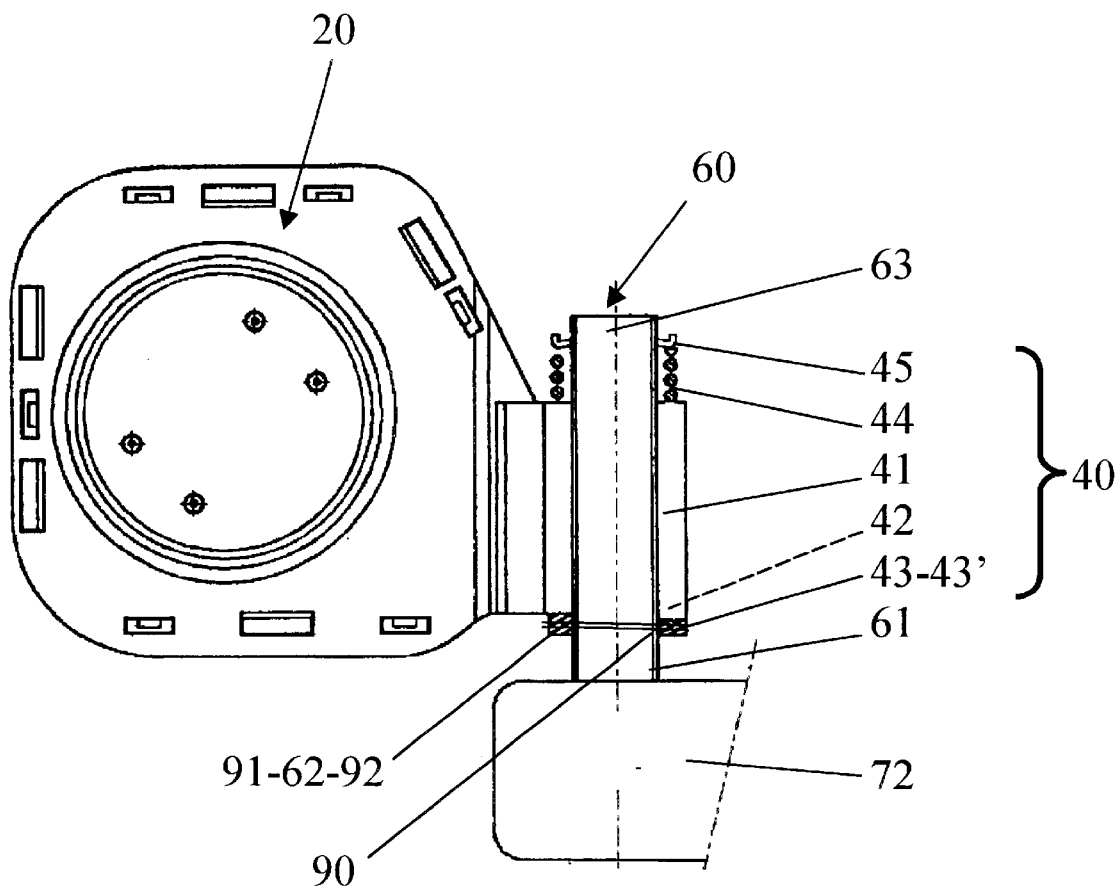
FIG. 2 shows a front view of the support structure of the mirror containing the stabilization device.
Figure 3:
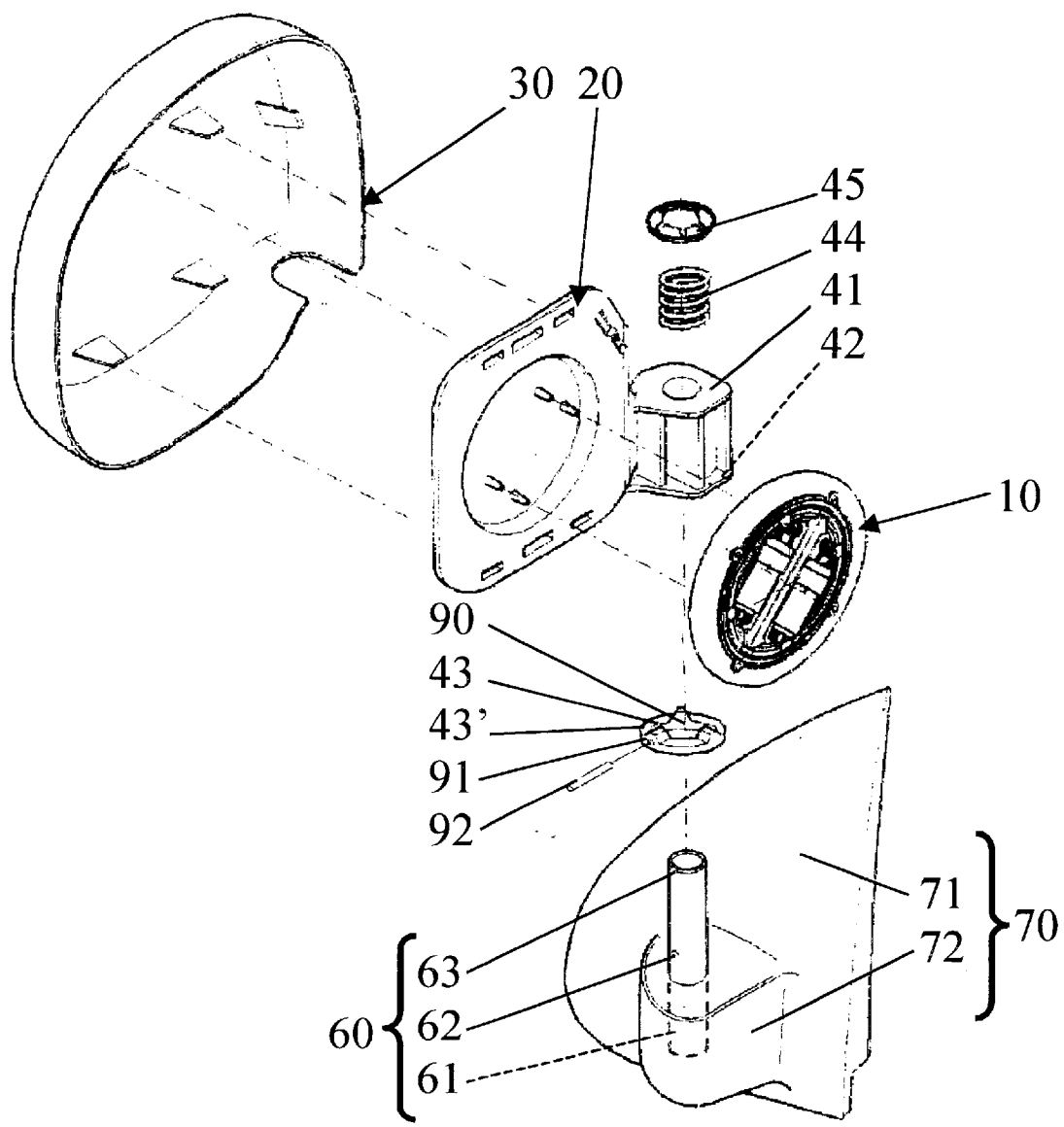
FIG. 3 shows an exploded perspective view of the mirror and stabilization device of FIG. 1.

As shown in the accompanying figures, the stabilization device for a rear-view mirror of a vehicle, according to the present invention, generally comprises a mirror set 1 and a base 70 for receiving the mirror set 1 in an articulated manner, the base 70 fixed in a lateral side 80 of the vehicle.

The mirror set essentially comprises a mirror plate 2 and a mechanical or electrical device for regulating the position of the mirror plate. The regulating device includes an activator 10, in which is fixed the back side of the mirror plate, transmission cables or an electric cable 11, derived from the activator, and activation levers or buttons 12, positioned inside the vehicles and to which the cables connect. The mirror set 1 further includes a support structure 20, in which the activator 10 of the mirror plate 2 remains fixed, and a housing 30 with an opening 31 directed toward the rear region of the vehicle and which accommodates the mirror plate 2, the mirror plate activator 10, and the support structure 20. The housing 30 is also fixed in the support surface 20. The stabilization device 40 for stabilizing the mirror position is incorporated in the support structure, which is mounted in an articulated manner around a vertical pivot post 60 of the base 70. The base 70 is generally made up of the pivot post 60 and by a plate structure 71 which is fixed in the lateral side 80 of the vehicle and which has an extension or flange portion 72, into which an end of the post 60 is incorporated.

In the above-mentioned application by the Applicant, which is incorporated by reference, the stabilization device 40 determines and sets the stabilization of the mirror set through an axial squeezing "F" force to the pivot post 60. The device 40 generally comprises a sleeve 41 incorporated in the end of the support structure 20 and being directed to the vehicle. The sleeve is tightly disposed and is free to turn about the pivot post 60. The device 40 also includes a first indented surface 42 of the mirror set 1 disposed in one of the ends of the sleeve 41 around the pivot post 60, and a second indented surface 43 of the base 70, disposed around the pivot post 60 and adjacent to the first indented surface 42 of the sleeve 41. The first indented surface 42 and the second indented surface 43 are configured with profiles to correspondingly engage one in the other. An axial compression spring 44 is disposed around the pivot post 60, one end of which is pressed against the end of the sleeve 41 opposed to the end of the sleeve 41 containing the indented surface 42. A reaction washer 45 is fixed around the pivot post 60 and which presses against the end of the spring 44.

The spring 44 is selected to compress the first indented surface 42 of the mirror set 1 against the second indented surface 43 of the base with an adequate "F" axial force to order to affect the locking between the indented surfaces 42, 43 and the stabilization of the mirror set 1 in the base 70 under normal use conditions. Further, when the mirror set 1 receives an impact with torque force $0 > \text{"T"} < \text{"T"}_{of\ balance}$, this torque force is not repelled without jeopardizing its integrity or torque force $\text{"T"}_{of\ balance} < \text{"T"} < \text{"T"}_{maximum}$, which is repelled with its integrity preserved.

The indented surfaces 42, 43 preferably comprise projections and small channels having trapezoidal cross-sections, radially disposed in an end of the sleeve 41 and around the pivot post 60, respectively. Alternatively, the projections can be disposed around the pivot post 60 and the small, trapezoidal channels can be disposed in an end of the sleeve 41. In either configuration, the oblique, lateral surfaces of the surfaces 42, 43 remain abutted one against the other and have selected inclinations to prevent sliding against one another when the mirror set receives torque forces $0 < \text{"T"} < \text{"T"}_{of\ balance}$ and $\text{"T"}_{of\ balance} < \text{"T"} < \text{"T"}_{maximum}$.

The present structure of the stabilizing device 40 for stabilizing the mirror position provides an improved configuration of the pivot post 60 and the second indented surface 43. The pivot post 60 has an inferior, or lower, free end 61 incorporated in the flange portion 72 of the base 70 and a radial opening or hole in an intermediate region of the post 60. The post 60 further has a second, superior, free end 63. The second indented surface 43 is incorporated in the superior surface of a ring 43' having a central opening 90 that is tightly connected to and crossed by the pivot post 60. The ring 43' also includes a radial hole 91 that is aligned to the radial hole 62 of the pivot post 60. A pin 92 fixes the ring 43' in the pivot post 60 and is inserted through the aligned radial holes 91, 62 of the ring 43' and the pivot post 60, respectively.

It will be understood that each of the elements described above, or two or more together, may also find a useful application in other types of constructions differing from the types described above.

While the invention has been illustrated and described herein as a stabilization device for rear-view mirrors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rear-view mirror assembly for motor vehicles, comprising:
    a base member (70) having a vertical pivot post (60) and a plate structure (71), said plate structure secured to a lateral side (80) of said vehicle and having a flange portion (72), of said motor vehicle, wherein a first free end of said pivot post is incorporated into said flange portion (72), wherein said pivot post (60) has a radial opening (62) in an intermediate region of said pivot post (60);
    a mirror set (1) connected to said base (70) in an articulated manner, said mirror set comprising a mirror plate (2); a regulating device (10; 11; 12) with an activator for regulating a selected position of said mirror plate; and a support structure (20), wherein said activator is secured to said support structure;
    a housing (30) fixed to said support structure and surrounding said mirror set (10);
    a stabilizing member (40) for stabilizing said position of said mirror plate (2), said stabilizing member (40) incorporated into said support structure (20) and disposed in an articulated manner around said vertical pivot post (60), wherein said stabilizing member (40) stabilizes the mirror set (1) through an axially applied squeezing force on the pivot post (60), said stabilizing member (40) comprising a sleeve (41) incorporated into said support structure (20) and articulated in said pivot post (60), said sleeve (41) having a first indented surface (42);
    a ring member (43') having a central opening (90), said pivot post (60) received through said ring member (43'), said ring member (43') further having a radial opening (91) aligned to the radial opening (62) of the pivot post (60), wherein a second indented surface (43) is incorporated into a face of said ring member (43'), wherein said first indented surface (42) and said second indented surface (43) are profiled to correspondingly engage one another;
    a pin (92) for securing said ring member (43') about said pivot post (60), wherein said pin (92) is received through said aligned radial openings (91, 62) of said ring member (43') and said pivot post (60), respectively.

2. The assembly according to claim 1, further comprising an axial compression spring (44) disposed around said pivot post (60) to compress said sleeve (41) and to bring into contact said first indented surface (42) and said second indented surface (43).

3. The assembly according to claim 2, further comprising a reaction washer (45) fixed around said pivot post (60), said compression spring (44) pressing against said reaction washer (45).

* * * * *